US012641469B2

(12) United States Patent
Somashekar et al.

(10) Patent No.: US 12,641,469 B2
(45) Date of Patent: May 26, 2026

(54) TERRESTRIAL SYSTEM AND METHOD FOR MITIGATING INTERFERENCE THROUGH INTER-FREQUENCY OFFLOADING

(71) Applicant: T-MOBILE INNOVATIONS LLC, Overland Park, KS (US)

(72) Inventors: Sharath Somashekar, Overland Park, KS (US); Mason Tyler Bouffard, Seattle, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 337 days.

(21) Appl. No.: 18/231,530

(22) Filed: Aug. 8, 2023

(65) Prior Publication Data

US 2025/0056298 A1 Feb. 13, 2025

(51) Int. Cl.
*H04W 28/02* (2009.01)
*H04W 28/08* (2023.01)

(52) U.S. Cl.
CPC ..... *H04W 28/0205* (2013.01); *H04W 28/021* (2013.01); *H04W 28/0236* (2013.01); *H04W 28/08* (2013.01)

(58) Field of Classification Search
CPC ........... H04W 28/0205; H04W 28/021; H04W 28/0236; H04W 28/08
See application file for complete search history.

(56) References Cited

U.S. PATENT DOCUMENTS

| | | | |
|---|---|---|---|
| 5,485,167 A | 1/1996 | Wong et al. | |
| 11,024,981 B2 | 6/2021 | Chiang et al. | |
| 2019/0239082 A1* | 8/2019 | Ravishankar | H04B 7/18528 |
| 2022/0007200 A1* | 1/2022 | Sevindik | H04W 52/143 |
| 2022/0368411 A1* | 11/2022 | Speidel | H04B 7/18513 |

FOREIGN PATENT DOCUMENTS

| | | |
|---|---|---|
| CN | 110380234 B | 9/2021 |
| EP | 3 275 045 B1 | 5/2020 |

* cited by examiner

*Primary Examiner* — Khoa Huynh
(74) *Attorney, Agent, or Firm* — SHOOK, HARDY & BACON L.L.P.; Elena K. McFarland

(57) ABSTRACT

Aspects herein for mitigating degraded communication quality experienced between a user device and a satellite due to overlapping radio frequency spectrum reuse by user devices communicating with terrestrial base stations via a telecommunications network. When the uplink quality is below a quality threshold, the telecommunications network identifies base stations with coverage areas that overlap with the coverage area of the satellite. The telecommunications network instructs and causes those base stations to adjust inter-frequency mobility thresholds for their uplink channels. Using an adjusted inter-frequency mobility threshold, user devices in communication with the terrestrial base stations are transferred to an uplink channel that does not overlap in the radio frequency spectrum used to communicate with the satellite. This mitigates degraded communication quality experienced between a user device and a satellite.

20 Claims, 6 Drawing Sheets

300

302 — RECEIVE A DEGRADATION INDICATOR FOR A FIRST HYBRID UPLINK CHANNEL BETWEEN A FIRST USER DEVICE AND AN AEROSPACE ACCESS POINT, THE DEGRADATION INDICATOR INCLUDING A UNIQUE IDENTIFIER FOR THE AEROSPACE ACCESS POINT

304 — IDENTIFY A BASE STATION BY QUERYING A DATABASE USING THE UNIQUE IDENTIFIER FOR THE AEROSPACE ACCESS POINT IN THE DEGRADATION INDICATOR, THE BASE STATION BEING IDENTIFIED AS HAVING A COVERAGE AREA THAT AT LEAST PARTIALLY OVERLAPS WITH A CURRENT COVERAGE AREA OF THE AEROSPACE ACCESS POINT, WHEREIN THE BASE STATION UTILIZES THE FIRST HYBRID UPLINK CHANNEL

306 — GENERATE AND EXECUTE COMPUTER-READABLE INSTRUCTIONS THAT INSTRUCT AND CAUSE THE BASE STATION TO ADJUST AN INTER-FREQUENCY THRESHOLD THAT CORRESPONDS TO THE FIRST HYBRID UPLINK CHANNEL

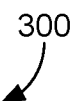

300

302～ RECEIVE A DEGRADATION INDICATOR FOR A FIRST HYBRID UPLINK CHANNEL BETWEEN A FIRST USER DEVICE AND AN AEROSPACE ACCESS POINT, THE DEGRADATION INDICATOR INCLUDING A UNIQUE IDENTIFIER FOR THE AEROSPACE ACCESS POINT

304～ IDENTIFY A BASE STATION BY QUERYING A DATABASE USING THE UNIQUE IDENTIFIER FOR THE AEROSPACE ACCESS POINT IN THE DEGRADATION INDICATOR, THE BASE STATION BEING IDENTIFIED AS HAVING A COVERAGE AREA THAT AT LEAST PARTIALLY OVERLAPS WITH A CURRENT COVERAGE AREA OF THE AEROSPACE ACCESS POINT, WHEREIN THE BASE STATION UTILIZES THE FIRST HYBRID UPLINK CHANNEL

306～ GENERATE AND EXECUTE COMPUTER-READABLE INSTRUCTIONS THAT INSTRUCT AND CAUSE THE BASE STATION TO ADJUST AN INTER-FREQUENCY THRESHOLD THAT CORRESPONDS TO THE FIRST HYBRID UPLINK CHANNEL

Figure 4:
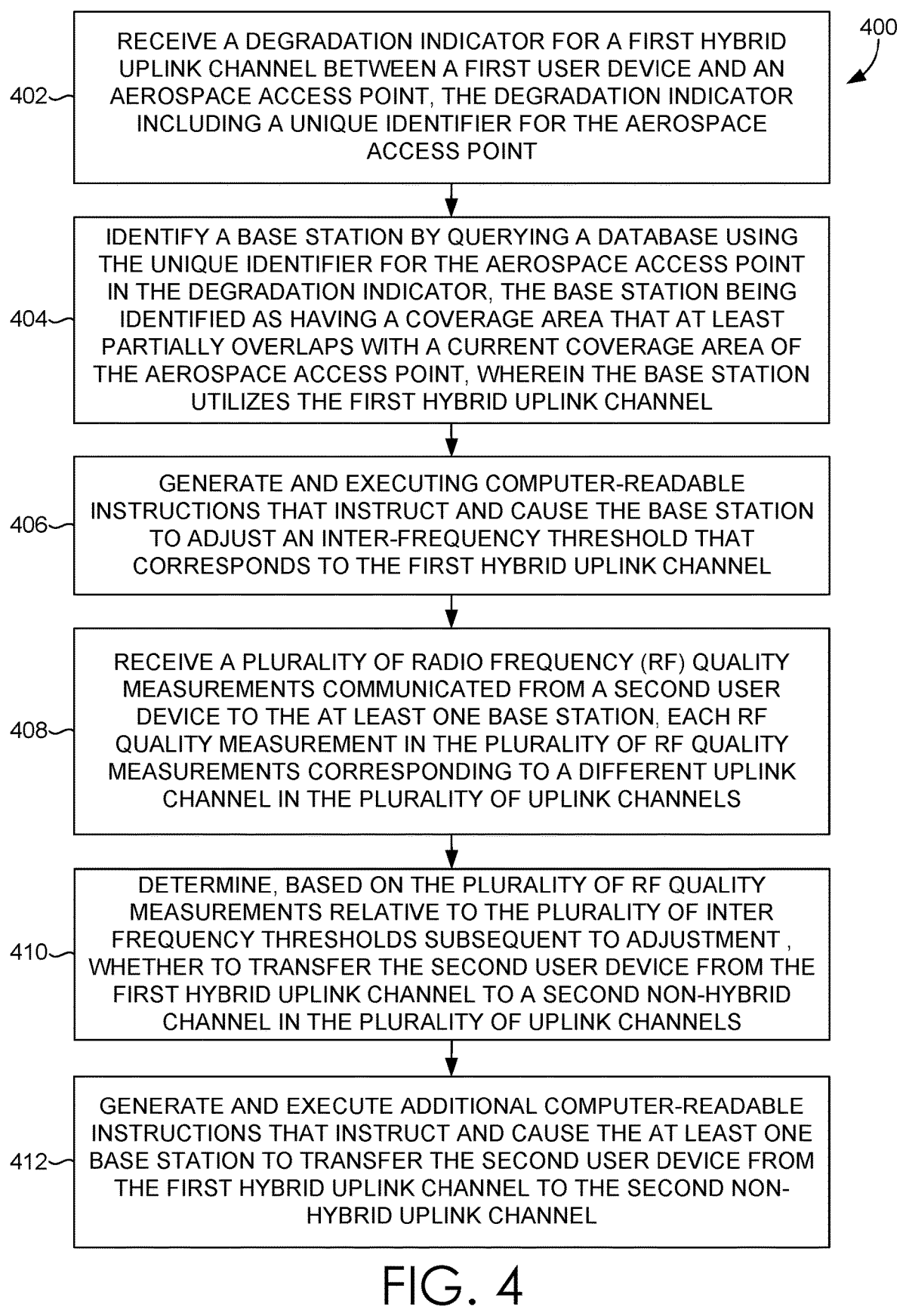

402 — RECEIVE A DEGRADATION INDICATOR FOR A FIRST HYBRID UPLINK CHANNEL BETWEEN A FIRST USER DEVICE AND AN AEROSPACE ACCESS POINT, THE DEGRADATION INDICATOR INCLUDING A UNIQUE IDENTIFIER FOR THE AEROSPACE ACCESS POINT

404 — IDENTIFY A BASE STATION BY QUERYING A DATABASE USING THE UNIQUE IDENTIFIER FOR THE AEROSPACE ACCESS POINT IN THE DEGRADATION INDICATOR, THE BASE STATION BEING IDENTIFIED AS HAVING A COVERAGE AREA THAT AT LEAST PARTIALLY OVERLAPS WITH A CURRENT COVERAGE AREA OF THE AEROSPACE ACCESS POINT, WHEREIN THE BASE STATION UTILIZES THE FIRST HYBRID UPLINK CHANNEL

406 — GENERATE AND EXECUTING COMPUTER-READABLE INSTRUCTIONS THAT INSTRUCT AND CAUSE THE BASE STATION TO ADJUST AN INTER-FREQUENCY THRESHOLD THAT CORRESPONDS TO THE FIRST HYBRID UPLINK CHANNEL

408 — RECEIVE A PLURALITY OF RADIO FREQUENCY (RF) QUALITY MEASUREMENTS COMMUNICATED FROM A SECOND USER DEVICE TO THE AT LEAST ONE BASE STATION, EACH RF QUALITY MEASUREMENT IN THE PLURALITY OF RF QUALITY MEASUREMENTS CORRESPONDING TO A DIFFERENT UPLINK CHANNEL IN THE PLURALITY OF UPLINK CHANNELS

410 — DETERMINE, BASED ON THE PLURALITY OF RF QUALITY MEASUREMENTS RELATIVE TO THE PLURALITY OF INTER FREQUENCY THRESHOLDS SUBSEQUENT TO ADJUSTMENT , WHETHER TO TRANSFER THE SECOND USER DEVICE FROM THE FIRST HYBRID UPLINK CHANNEL TO A SECOND NON-HYBRID CHANNEL IN THE PLURALITY OF UPLINK CHANNELS

412 — GENERATE AND EXECUTE ADDITIONAL COMPUTER-READABLE INSTRUCTIONS THAT INSTRUCT AND CAUSE THE AT LEAST ONE BASE STATION TO TRANSFER THE SECOND USER DEVICE FROM THE FIRST HYBRID UPLINK CHANNEL TO THE SECOND NON-HYBRID UPLINK CHANNEL

| 502 | ANTENNA | SUN SENSOR | 512 |
| 504 | TRANSPONDER | EARTH SENSOR | 514 |
| 506 | POWER SUPPLY | THERMAL CONTROL SYSTEM | 516 |
| 510 | ORIENTATION & STABILIZATION SYSTEM | PROPULSION SYSTEM | 518 |
| | | PROCESSORS | 520 |

600

MEMORY

604

PROCESSOR(S)

606

PRESENTATION
COMPONENT(S)

608

RADIO(S)

616

602

I/O PORT(S)

610

I/O COMPONENTS

612

POWER SUPPLY

614

TERRESTRIAL SYSTEM AND METHOD FOR MITIGATING INTERFERENCE THROUGH INTER-FREQUENCY OFFLOADING

TECHNICAL BACKGROUND

The present disclosure generally relates to reusing portions of a radio frequency spectrum.

SUMMARY

A high-level overview of various aspects of the invention are provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

When a user device utilizes a portion of a radio frequency spectrum to communicate with an aerospace access point such as a deployed and orbiting satellite, noise and/or other interference may impact the communications between the user device and the aerospace access point. The noise and/or other interference experienced between the user device and the aerospace access point may be a result of one or more nearby user devices that are communicating with one or more terrestrial access points using the same or similar portion (e.g., at least partially overlapping, and/or adjacent) of the radio frequency spectrum being used by the user device and the aerospace access point. To mitigate, prevent, or reduce the noise and/or other interference between the user device and the aerospace access point, embodiments herein provide a technological solution for adjusting inter-frequency mobility thresholds in a manner that preferentially offloads user devices from one or more hybrid uplink channels to one or more non-hybrid uplink channels.

In one aspect, a computerized method is provided. In accordance with the method, a degradation indicator is received for a first hybrid uplink channel between a first user device and an aerospace access point. The degradation indicator includes a unique identifier for the aerospace access point. A base station is identified, in aspects, by querying a database using the unique identifier for the aerospace access point in the degradation indicator. The base station is identified as having a coverage area that at least partially overlaps with a current coverage area of the aerospace access point, in various aspects, wherein the base station utilizes the first hybrid uplink channel. Computer-readable instructions are generated and executed which instruct and cause the base station to adjust an inter-frequency threshold that corresponds to the first hybrid uplink channel.

In another aspect, one or more non-transitory computer-readable media are provided for storing instructions that when executed via one or more processors perform a computerized method. In aspects, a degradation indicator for a first hybrid uplink channel between a first user device and an aerospace access point is received. The degradation indicator includes a unique identifier for the aerospace access point. One or more base stations are identified by querying a database using the unique identifier for the aerospace access point in the degradation indicator, in aspects. The one or more base stations are identified as having one or more coverage areas that at least partially overlap with a current coverage area of the aerospace access point, and the one or more base stations utilize the first hybrid uplink channel. In various aspects, computer-readable instructions are generated and executed that instruct and cause at least one base station of the one or more base stations identified to adjust a plurality of inter-frequency thresholds that correspond to a plurality of uplink channels, which includes the first hybrid uplink channel.

In yet another aspect, a system is provided. The system comprises a server having one or more processors. The server operates within a telecommunications network and is communicatively coupled to a base station within the telecommunications network. The one or more processers operate to receive a degradation indicator for a first hybrid uplink channel between a first user device and an aerospace access point, the degradation indicator including a unique identifier for the aerospace access point. Further, a base station is identified by querying a database using the unique identifier for the aerospace access point in the degradation indicator, the base station being identified as having a coverage area that at least partially overlaps with a current coverage area of the aerospace access point, wherein the base station utilizes the first hybrid uplink channel. Via the one or more processors, computer-readable instructions are generated and executed that instruct and cause the base station to adjust an inter-frequency threshold that corresponds to the first hybrid uplink channel.

BRIEF DESCRIPTION OF THE DRAWINGS

Aspects are described in detail below with reference to the attached drawings figures, wherein:

FIG. 3 depicts an example method, in accordance with one or more aspects;

FIG. 4 depicts another example method, in accordance with one or more aspects;

DETAILED DESCRIPTION

Figure 1:
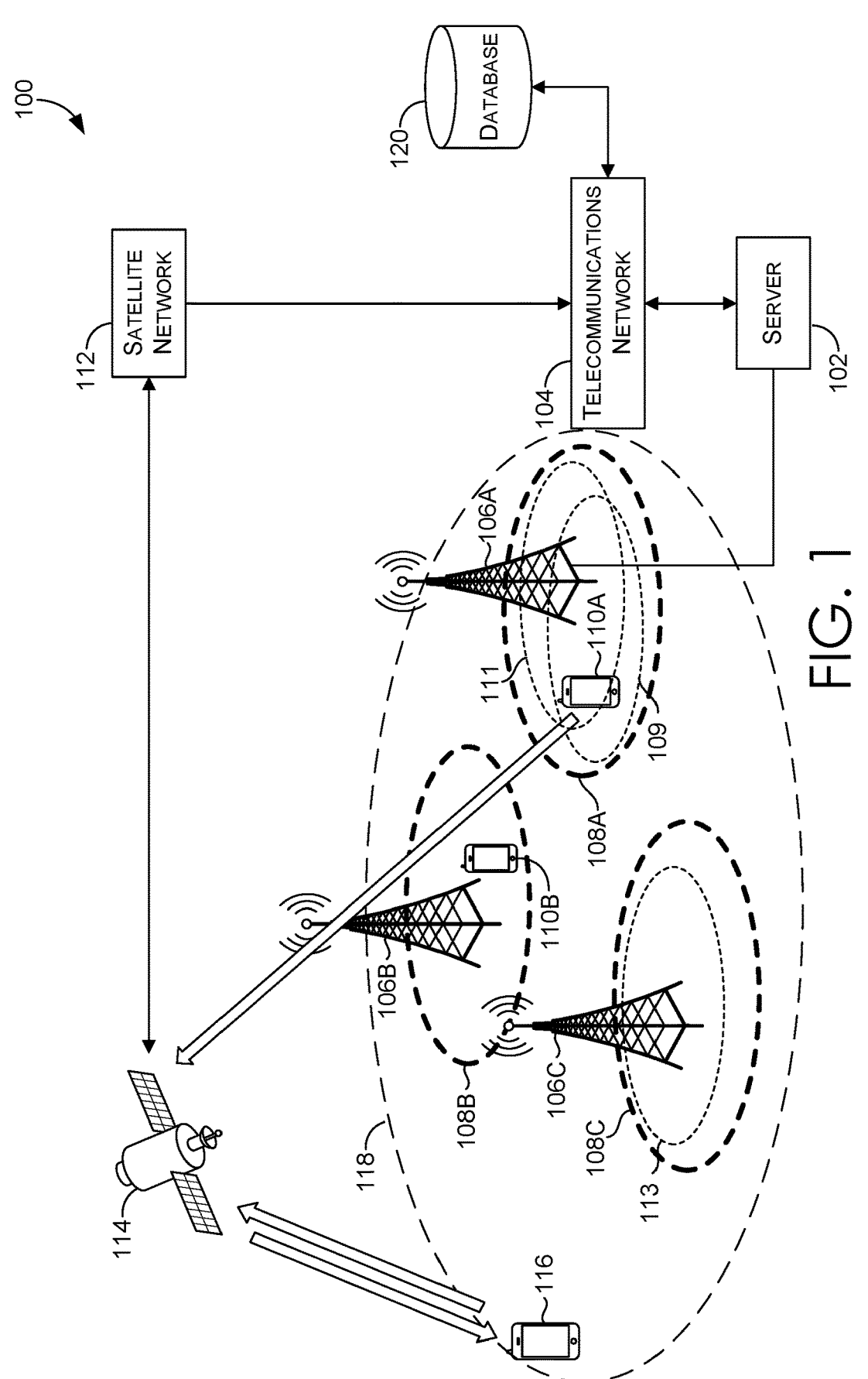
FIG. 1 depicts an example of a system environment, in accordance with one or more aspects.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments and aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G/5G NR Fifth-Generation Wireless Access Technology/New Radio
5GC Fifth-Generation Wireless Access Technology Core Network
AAU Active Antenna Unit
BRS Broadband Radio Service
CD-ROM Compact Disk Read Only Memory
CDMA Code Division Multiple Access
CU Central Unit
DU Distribution Unit
EIRP Equivalent Isotropically Radiated Power
eNodeB Evolved Node B
EVDO Evolution-Data Optimized
GIS Geographic/Geographical/Geospatial Information System
gNodeB/gNB Next Generation Node B
gNB CU Next Generation Node B Central Unit
gNB DU Next Generation Node B Distribution Unit
GPRS General Packet Radio Service
GSM Global System for Mobile Communication
iDEN Integrated Digital Enhanced Network
DVD Digital Versatile Disc
EEPROM Electrically Erasable Programmable Read-Only Memory
FD-MIMO Full Dimension Multiple-Input Multiple-Output
IoT Internet of Things
IIOT Industry Internet of Things
LED Light Emitting Diode
LTE Long Term Evolution
MEC Mobile Far Edge Computer
MD Mobile Device
MIMO Multiple-Input Multiple-Output
mMIMO Massive Multiple-Input Multiple-Output
MMU Massive Multiple-Input Multiple-Output Unit
mm Wave Millimeter Wave
NEXRAD Next-Generation Radar
NR New Radio
OOBE Out-of-Band-Emission
OTN Optical Transport Network
PC Personal Computer
PCS Personal Communications Service
PDA Personal Digital Assistant
PLMN Public Land Mobile Network
PRB Physical Resource Block
vPRB Virtualized Physical Resource Block
RAN Radio Access Network
RAM Random Access Memory
RET Remote Electrical Tilt
RF Radio-Frequency
RFI Radio-Frequency Interference
RIC Radio Intelligent Controller
RLF Radio Link Failure
R/N Relay Node RNR Reverse Noise Rise
ROM Read-Only Memory
RRU Remote Radio Unit
RSRP Reference Signal Receive Power
RSRQ Reference Signal Receive Quality
RSSI Received Signal Strength Indicator
RU Radio Unit
SINR Signal-to-Interference-&-Noise Ratio
SNR Signal-to-Noise Ratio
SON Self-Organizing Networks
TDMA Time Division Multiple Access
TXRU Transceiver (or Transceiver Unit)
UE User Equipment
UMTS Universal Mobile Telecommunications System
UTRAN UMTS Radio Access Network
E-UTRAN Evolved Universal Mobile Telecommunications System
WCD Wireless Communication Device (interchangeable with UE)
WLAN Wireless Local Area Network
XR Extended Reality Further, various technical terms are used throughout this description. An illustrative resource that fleshes out various aspects of these terms can be found in Newton's Telecom Dictionary, 25th Edition (2009).

Aspects herein may be embodied as, among other things: a method, system, or set of instructions embodied on one or more computer-readable media. Aspects may take the form of a hardware embodiment or an embodiment combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the computing device 400 shown in FIG. 6. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection and wireless media such as acoustic, radio frequency (RF), infrared, and other wireless media. Combinations of any of the above may also be included within the scope of computer-readable media.

"Aerospace" is used herein to refer generally to the Earth's atmosphere and the outer space within the proximate vicinity of the Earth's atmosphere. In the context of an access point, the term "aerospace" is used to refer to a physical location of such an access point that is located within and/or orbiting within the Earth's atmosphere (e.g., in the thermosphere or exosphere) and/or the outer space within the proximate vicinity of the Earth's atmosphere, such that said physical location is not at or upon the Earth's surface.

"Network" refers to a network comprised of wireless and wired components that provide wireless communications service coverage, for example, to one or more user devices. For example, the network may include one or more, or a plurality of, wireless networks, hardwired networks, telecommunication networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, CDMA, CDMA 1×A, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Physical resource block" (PRB) is used to refer to a defined quantity of consecutive subcarriers in a frequency domain that is used for wireless transmission and wireless reception of waveform signals via antennas/antenna elements. In some instances, a physical resource block has a defined quantity of consecutive subcarriers in a frequency domain within one slot in a time domain (e.g., LTE). In other instances, a physical resource block has a defined quantity of consecutive subcarriers in a frequency domain independent of the time domain (e.g., 5G NR). In one example, one resource block has twelve consecutive subcarriers of a frequency domain, where one subcarrier corresponds to one resource element in the resource block. The bandwidth of various physical resource blocks is dependent on the numerology and subcarrier spacing utilized, which corresponds to the frequency bands as defined in kilohertz (kHz) and which determines the cyclic prefix of said block in milliseconds (ms). For example, 5G NR technology supports subcarrier spacing of 15, 30, 60, 120, and 240 kHz while LTE technology supports only one subcarrier spacing of 15 kHz. The physical resource blocks form bandwidth parts (BWP). The physical resource blocks discussed herein are compatible and usable in LTE, LTE-M, 3G, 4G, 5G, IoT, IIoT, NB-IoT, and similar technologies without limitation. For this reason, physical resource blocks are discussed herein in a network-agnostic manner, as the aspects discussed herein can be implemented within each of the different technology environments.

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, and mMIMO). An example of an aerospace access point includes a satellite. Examples of a terrestrial access point include a base station, eNodeB, a gNodeB, a macro cell, a small cell, a micro cell, a femto-cell, a pico-cell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Cell site" is generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/ coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

The term "hybrid uplink channel" refers generally to an uplink channel that is associated with or corresponds to a radio frequency, a range of radio frequencies, and/or a radio frequency spectrum comprised of a plurality of radio frequencies that, for example, may or may not be continuous/continuous, where the frequency or frequencies for that uplink channel are concurrently and/or simultaneously used for communications between user device(s) and aerospace access point(s), and for communications between user device(s) and terrestrial access point(s). As such, a hybrid uplink channel is "shared" and/or "reused" by aerospace and terrestrial networks.

The term "non-hybrid uplink channel" refers generally to an uplink channel that is associated with or corresponds to a radio frequency, a range of radio frequencies, and/or a radio frequency spectrum comprised of a plurality of radio frequencies that, for example, may or may not be continuous/continuous, where that uplink channel is used only terrestrially. In other words, a non-hybrid uplink channel is utilized for communications between user device(s) and terrestrial access point(s), and is not utilized for communications between for communications between user device(s) and aerospace access point(s). As such, a non-hybrid uplink channel is not shared and is not reused by aerospace and terrestrial networks.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

As mentioned above, noise and/or other interference may impact the communications between a user device and an aerospace access point when that user device utilizes the same portion ("shared") of a radio frequency spectrum that one or more nearby user devices are also using to communicate with one or more terrestrial access points. To mitigate, prevent, and/or reduce the noise and/or other interference experienced between the user device and the aerospace access point, components operating within the terrestrial network are instructed to change, adjust, and/or otherwise modify one or more inter-frequency mobility thresholds that are implemented in connecting user devices to terrestrial access points on the terrestrial network. The terms "inter-frequency mobility threshold" and "inter-frequency threshold" are used interchangeably herein to refer to the same, unless or except where discussed otherwise. By reducing or lowering an inter-frequency threshold (e.g., reducing a threshold of $-110$ decibels [dB] to $-100$ dB) that corresponds to or governs the shared radio frequency spectrum, the one or more nearby user devices communicating with a terrestrial access point can be handed over or transitioned onto a different radio frequency spectrum (e.g., at the same or a different terrestrial access point) that is not being reused by the user device and an aerospace access point. By handing over or transitioning the nearby user devices a different radio frequency uplink channel as a result of adjusting the inter-frequency threshold, the impact of the uplink communications of the nearby user devices is reduced with regard to the communications between the user device and the aerospace access point. By offloading the nearby user devices from the shared radio frequency spectrum (e.g., terrestrial and aerospace) to an unshared radio frequency spectrum (e.g., terrestrial user only), this mitigates, prevents, and/or reduces the noise and/or other interference experienced between the user device and the aerospace access point on the shared radio frequency spectrum.

FIG. 1 depicts an example of a network environment 100, in accordance with one or more embodiments. The network environment 100 includes a server 102 having one or more processors. The server 102 operates within and thus is communicatively coupled to a telecommunications network 104 or its components. The server 102 is communicatively coupled to one or more base stations 106A, 106B, and 106C within the telecommunications network 104. Each of the one or more base stations 106A, 106B, and 106C has a corresponding coverage area 108A, 108B, and 108C. The one or more base stations 106A, 106B, and 106C can provide telecommunications services to one or more user devices 110A and 110B.

In the network environment 100 shown, the telecommunications network 104 interfaces with satellite network 112, which is also referred to as an aerospace network. In one aspect, the server 102 operates as, or is communicatively coupled to, a telecommunications core network component that acts as an interface between the satellite network 112 and the telecommunications network 104. The satellite network 112 can include one or more devices configured to act as aerospace access points, such as satellite 114. Although not shown, the satellite network 112 may interface with and communicate with one or more terrestrial radio elements that are not associated with the telecommunications network 104. The satellite 114 can provide connectivity to a user device 116 that is located within the coverage area 118 of the satellite 114.

In aspects, the user device 110A that is located within coverage area 108A communicates with the base station 106A, such that the base station 106A provides the user device 110A with connectivity to and services of the telecommunications network 104. The user device 110A may communicate with the base station 106A using Frequency Division Duplexing (FDD), in some aspects. In one such aspect, the user device 110A sends communications to the base station 106A over an uplink channel, using one or more particular radio frequencies designated for the uplink channel in accordance with FDD techniques. Meanwhile, the user device 116 that is located within the coverage area 118 may send communications to the satellite 114 over an uplink channel. These communications of the user device 116 may be transmitted using the same particular radio frequencies designated for the uplink channel, and which are being used by the user device 110A to communicate with the base station 106A. Due to the proximity and/or at least a partial overlap of the coverage area 118 of the satellite 114 with the coverage area 108A of the base station 106A, the use of the same radio frequencies by the user device 116 and the user device 110A can result in noise and/or other interference on the uplink channel. For example, the satellite 114 may detect, measure, and/or determine that noise and/or interference is occurring, based on one or more communications between the user device 110A and the satellite 114 over the uplink channel being impacted by other uplink communications. The amount or level of noise and/or interference may be detected, measured, and/or determined by the user device 116 and reported to the satellite 114, in some instances.

In aspects discussed herein, coverage area 108A includes one or more uplink channels. The first hybrid uplink channel 109 corresponds to a shared radio frequency spectrum. The second non-hybrid uplink channel 111 corresponds to an unshared radio frequency spectrum (i.e., terrestrial only). In the example of FIG. 1, the first hybrid uplink channel 109 and the second non-hybrid uplink channel 111 are associated with the base stations 106A. In contrast, a third non-hybrid uplink channel 113 is shown at a neighboring base station, base station 106C.

Figure 2:
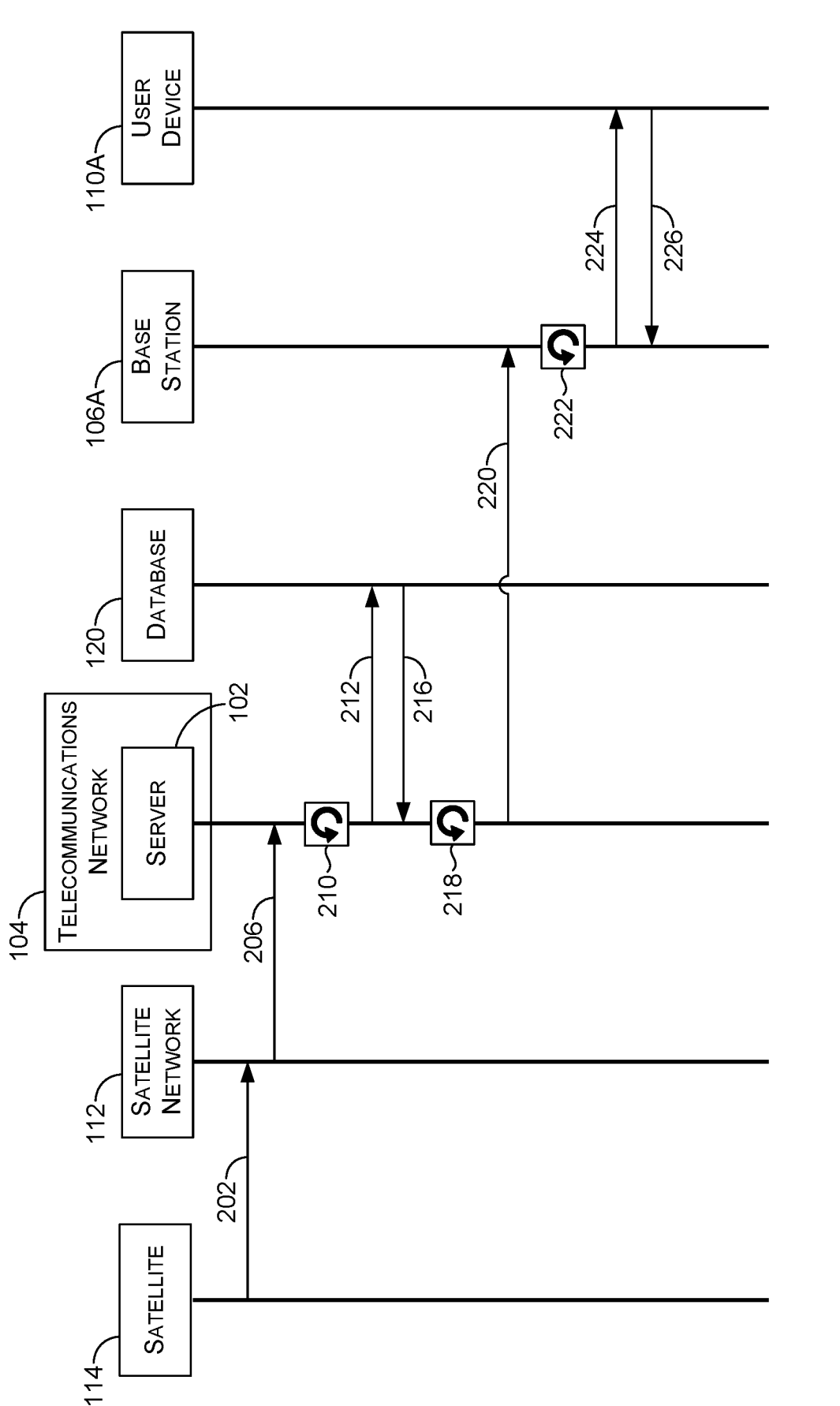
FIG. 2 depicts a diagram of communications involving the system of FIG. 1, in accordance with one or more aspects.

As shown in the diagram 200 of FIG. 2, based on the noise and/or other interference (referred to hereinafter as "noise" for brevity) that is detected, measured, determined, and/or identified by the satellite 114 in communication with a user device, such as the user device 116, a degradation indicator can be generated and communicated 202 by the satellite 114 via the satellite network 112. The degradation indicator can further be communicated 206 through the satellite network 112 to the telecommunications network 104, where the server 102 is located. In various aspects, the degradation indicator can include or specify a unique identifier that particularly identifies and distinguishes the satellite 114 from other satellites and/or terrestrial access points. As such, the server 102 can receive the degradation indicator, which may be specific to an uplink channel between the user device 116 and the satellite 114. The degradation indicator can identify the satellite 114 and/or specify specifications and configurations of the satellite 114, in aspects. The degradation indicator can, in various aspects, identify the satellite network 112 and/or specify specifications and configurations of the satellite network 112. In some aspects, the degradation indicator can identify and/or specify a unique identifier that particularly identifies and distinguishes the user device 116 from other user devices, such as user devices 110A, 110B, and 110C. The degradation indicator can specify specifications and configurations of the user device 116, in aspects. Additionally, in some aspects, the degradation indicator can specify a value (e.g., numerical) for the noise and/or other interference, such as a measurement that captures or quantifies the noise measured by the user device and/or the satellite, in various aspects. For example, any value in the range of −10 and +40 decibels (dB) could be utilized and included in the degradation indicator to quantify or represent the signal quality of the uplink channel, for which noise is detected. Additionally or alternatively, the degradation indicator can indicate and/or specify that the noise measurement is determined to be less than, meet, or exceed a particular threshold or threshold value for noise.

In response to receipt of the degradation indicator and/or information encoded therein, the server 102 can determine 210 whether a signal quality of the uplink channel between the user device 116 and the satellite 114 does not meet a threshold based on the degradation indicator. In one example, the server 102 may determine that when the value for the signal quality of the uplink channel between the user device 116 and the satellite 114 meets or exceeds 20 dB, no further action is needed as the signal quality is sufficient. In another example, the server 102 may determine that when the value for the signal quality of the uplink channel between the user device 116 and the satellite 114 is below 20 dB, mitigation techniques should be implemented. When the signal quality of the uplink channel between the user device 116 and the satellite 114 does not meet a threshold based on the degradation indicator, the server 102 can further determine to implement actions that mitigate, prevent, and/or reduce uplink interference.

The server 102 generates and communicates 212 a query to a database 120 that is communicatively available or accessible via one or more of the telecommunications network 104 and/or satellite network 112. The server 102 may, for example, input a unique identifier specified in the degradation indicator and the current date and time (e.g., a date and time/a timestamp that is associated with the generation of and/or the server's receipt of the degradation indicator), which together, act as a query string for locating data that specifically corresponds to the satellite 114. In such an example, the unique identifier may be utilized as, or can itself act as, a query. This query can be used to particularly identify the satellite 114, the satellite network 112 in which the satellite 114 is operating, configurations of the satellite 114 and/or the satellite network 112, or any combination thereof.

The database 120 stores a plurality of unique satellite identifiers, and each unique satellite identifier is linked to or stored in association with a detailed trajectory path for that particular satellite. A trajectory path includes a plurality of geographic surface areas or locations, which can correspond to coverage areas of that satellite, as well as the dates and times at which the satellite's overhead travel above the Earth corresponds to those particular geographic surface areas. In various aspects, the detailed trajectory path data includes projected paths with full sequences of future dates and times. As such, the database 120 stores a plurality of travel trajectories for various satellites, and the trajectories to be traveled by those satellites determines the plurality of coverage areas of each satellite at specific, corresponding dates and times. Based on a particular combination of date and time, the database 120 stores the geographic surface area for which the satellite 114 can provide communications coverage to user device(s) that is/are located within or at the edge of said geographic surface area on that date and at that time.

Additionally, the database 120 stores the geographic locations for a plurality of base stations, for example, as longitude and latitude coordinates. The geographic location may refer to the physical location of a cell tower associated with the base station and/or may correspond to all or a portion of a coverage area of the base station. The base stations may be stored in groups, each grouping being associated with each other based on the base stations' proximity to each other, proximity to one or more geographic surface areas in the trajectories of one or more satellites, locations within (or at the edge of) of more geographic surface areas in the trajectories of one or more satellites, and/or any combination thereof. For example, one grouping may include one or more base stations that are located within a specific geographic surface area that corresponds to a particular satellite's coverage area on a particular date and at a specific time. It will be understood that any base station may be part of more than one grouping, for any quantity of various satellites and their trajectories, based on the base station's location relative to the distinct trajectories of different satellites and those corresponding coverage areas.

As such, by querying the database using the unique identifier for the satellite and a current date and time, results are returned 216 from the database 120 to the server. Based on the returned results, the server 102 can identify one or more base stations to be used for implementing interference reduction techniques from within the group of base stations returned in the results. The one or more base stations are identified as having a physical location that is within or at the edge of the satellite's coverage area at the specific date and time included with the query, or having a location of a coverage area which completely or partially overlaps with the satellite's coverage area at the specific date and time included with the query. In other words, the base stations are identified as having one or more of their coverage areas that at least partially overlap with the current coverage area of the satellite, based on the current date and time. Thus, uplink communications between other user devices and these identified base stations are predicted, based on the server 102 and the query results, to be the cause of the noise occurring on the uplink channel between the user device 116 and the satellite 114 because these base stations are proximate to or within the satellite's coverage area, and because the uplink communications between other user devices and these base stations utilize all or some of the same (and/or adjacent) uplink frequencies as the user device 116 is utilizing to communicate with the satellite 114. The server 102 determines that implementing interference reduction techniques at the identified base stations is predicted to reduce noise and/or other interference that the base stations or user devices in communications therewith are causing on the uplink channel between the user device 116 and the satellite 114.

The server 102 can then generate 218 computer-readable instructions for the one or more base stations. In order to reduce uplink interference, the computer-readable instructions may specify and/or instruct each of the one or more base stations to change, adjust, and/or modify an inter-frequency threshold that corresponds to the first hybrid uplink channel of the terrestrial base station(s).

For example, an inter-frequency threshold that defines an A2 event can be modified. In such an example, an A2 event is detected and/or occurs when a measurement ("Ms") of a communications signal, plus or minus a buffer or offset value (e.g., hysteresis parameter ["Hys"] that can be used to prevent "ping-pong" handovers) is below a defined threshold value (Thresh). Accordingly, an A2 event occurs when Ms+Hys<Thresh. In this example, an A2 event may be used to automatically trigger or initiate inter-frequency measurement(s) which lead to a mobility procedure to hand over or transition a user device in a manner that is predicted to improve the communication signal quality. Accordingly, by modifying Thresh (and/or Hys), an A2 event can be detected differently. For example, when a Thresh value is raised, a Ms value can be higher before automatically triggering or initiating a mobility procedure to hand over or transition a user device, while when a Thresh value is lowered, a lower Ms value will automatically trigger or initiate a mobility procedure to hand over or transition a user device. In further examples, an A2 event may persist until a cancellation condition occurs or is detected, defined as Ms-Hys>Thresh. Generally, Ms is captured by the access point and can be expressed in dB. Examples of Ms include RSRP and RSRQ, for example. Hys can be a configurable value specified in dB, for example, any value between 0 and thirty, which may further be multiplied by 0.5 to determine the actual Hys value used when determining an A2 event. Thresh can be any configurable value, defined in the same unit(s) as Ms, for example. In aspects, the computer-readable instructions are generated to provide one or more adjustments and/or new values that define an inter-frequency threshold, such as Thresh for an A2 event. Additionally or alternatively, the computer-readable instructions are generated to provide one or more adjustments and/or new values for Hys, for determining an A2 event. It will be understood that the A2 event and corresponding are merely one illustrative example, such that other events (e.g., A3 event; B2 event) and corresponding threshold modifications are contemplated to be within the scope of the present disclosure.

Continuing, the server 102 communicates 220 the computer-readable instructions to the base station 106A directly or indirectly through the telecommunications network 104. In some aspects, the server 102 communicates 220 the computer-readable instructions to a plurality of base stations, such as base stations 106A, 106B, and 106C, directly or indirectly through the telecommunications network 104. The computer-readable instructions, as shown in the example of FIG. 2, can be executed to cause the base station 106A to generate 222 additional information and/or additional instructions associated with the inter-frequency threshold (e.g., generating and sending the inter-frequency threshold(s) via an Radio Resource Control [RRC] connection reconfiguration message), which are then communicated 224 to the user device 110A, via the downlink. The base station 106A may implement and/or store the new inter-frequency threshold. The user device 110A can then adhere to the new inter-frequency threshold. Thus, the base station 106A may handover or transition the user device 110A from the first hybrid uplink channel to the second non-hybrid uplink channel when the modified inter-frequency threshold is not met by one or more measurements of the user device 110A (Ms+Hys<Thresh).

When the user device 110A communicates 226 with the base station 106A using the second non-hybrid uplink channel 111 after a handover or transition, the user device 110A is no longer using the first hybrid uplink channel 109. As such, noise and/or other interference that is caused by the user device 110A and experienced on the uplink channel between the satellite 114 and the user device 116 is reduced or mitigated, as the user device 110A is presently communicating using other frequencies specific to the second non-hybrid uplink channel, and which do not overlap with the frequencies specific to the first hybrid uplink channel. For example, the user device 110 may be transitioned from a hybrid uplink channel having a bandwidth of 5 megahertz (MHz) to a non-hybrid uplink channel that has a bandwidth of 20 to 100 MHz at the same base station 106A or even to another non-hybrid uplink channel.

In aspects, user devices operating in the cell edge range (e.g., user devices associated with measurements such as RSRP values of –105 to –125 decibel milliwatts (dBm) and/or physically located toward the boundaries of a coverage area) that are communicating with a terrestrial access point using a hybrid uplink channel, are predicted to cause noise and other interference that negatively impacts other user devices that are communicating with aerospace access point(s) using the same or similar hybrid uplink channel. This is because user devices operating in the cell edge range are utilizing increased uplink power when communicating with the access point in order to compensate for distance and degraded communications quality.

Having described the network environment 100 and components thereof, it will be understood by those of ordinary skill in the art that the network environment 100 is but one example of a suitable system and is not intended to limit the scope of use or functionality of the present invention. Similarly, the network environment 100 should not be interpreted as imputing any dependency and/or any requirements with regard to each component and combination(s) of components illustrated in FIGS. 1 and 2. It will be appreciated by those of ordinary skill in the art that the location of components illustrated in FIGS. 1 and 2 is an example, as other methods, hardware, software, components, and devices for establishing communication links between the components shown in FIGS. 1 and 2, may be utilized in implementations of the present invention. It will be understood to those of ordinary skill in the art that the components may be connected in various manners, hardwired or wireless, and may use intermediary components that have been omitted or not included in FIGS. 1 and 2 for simplicity's sake. As such, the absence of components from FIGS. 1 and 2 should not be interpreted as limiting the present invention to exclude additional components and combination(s) of components. Moreover, though components are represented in FIGS. 1 and 2 as singular components, it will be appreciated that some aspects may include a plurality of devices and/or components such that FIGS. 1 and 2 should not be considered as limiting the number of any of the depicted devices or components.

Turning to FIGS. 3 and 4, methods 300 and 400 are provided for mitigating interference. In some aspects, the methods 300 and 400 can be a computer-implemented method. In one aspect, one or more non-transitory computer-readable storage media having computer-readable instructions or computer-readable program code portions embodied thereon, for execution via one or more processors, can be used to implement and/or perform the methods 300 and 400. For example, computer-readable instructions or computer-readable program code portions can specify the performance of the methods 300 and 400, specify a sequence of steps of the methods 300 and 400 0, and/or can identify particular component(s) of software and/or hardware for performing one or more of the steps of the methods 300 and 400, in aspects. As discussed below, the methods 300 and 400 can be performed using software, hardware, component(s), and/or device(s) depicted in the example of FIGS. 1, 2, and 5. For example, various steps of the methods 300 and 400 may be performed by a terrestrial access point, a server, a terrestrial backhaul component, or any combination thereof.

At block 302, a degradation indicator is received for a first hybrid uplink channel between a first user device and an aerospace access point, wherein the degradation indicator includes a unique identifier for the aerospace access point. For example, when the one or more processors receive a communication from a user device over the first hybrid uplink channel, the one or more processors may measure the first hybrid uplink signal quality based on one or more of a Signal to Interference & Noise Ratio (SINR) measurement or a path loss measurement. When the uplink quality for the first hybrid uplink channel is determined to be below a quality threshold, a degradation indicator is generated that includes a unique apparatus identifier and an indication that uplink quality is less than the quality threshold. In various aspects, the quality threshold defines a determined value or a determined value range, and values that are less than the quality threshold are indicative of decreased signal quality, whereas values that meet or exceed the quality threshold are indicative of increased signal quality. The degradation indicator of the uplink quality is communicated to a terrestrial wireless network, for example from an aerospace network. Alternatively, the degradation indicator of the uplink quality is generated by the terrestrial wireless network in response to information received via the aerospace network, for example, information received and/or measured as corresponding to communications between a user device and the aerospace access point via the first hybrid uplink channel.

At block 304, a base station is identified by querying a database using the unique identifier for the aerospace access point in the degradation indicator, wherein the base station is identified as having a coverage area that at least partially overlaps with a current coverage area of the aerospace access point, and where the base station utilizes the first hybrid uplink channel. The base station is a terrestrial access point, in aspects, and although discussed as singular, it will be understood that a plurality of base stations can be identified as further discussed herein. The base station may be identified as the base station concurrently utilizes the first hybrid uplink channel for communications with user devices(s) and a second non-hybrid channel for communications with user device(s), wherein the first hybrid and second non-hybrid uplink channels are in a plurality of uplink channels for the base station(s). The plurality of uplink channels are utilized by user device(s) transmitting signals over specific frequencies to the base station(s), for example.

In aspects, one or more servers and/or one or more base stations in the terrestrial network determine whether one or more inter-frequency thresholds should be adjusted based on the degradation indicator and/or in response to the identification of base station(s) from receipt of the degradation indicator. For example, a value that defines an inter-frequency threshold and/or a value that defines a hysteresis parameter can be increased or decreased relative to a present or current value that is in use by one or more base station(s). Generally, the value that defines the inter-frequency threshold and/or the value that defines the hysteresis parameter are specific to the first hybrid uplink channel. For example, the server and/or base station may determine that the inter-frequency threshold defined for, at least, the first hybrid uplink channel should be decreased to a particular value or decreased by a particular value (e.g., by a preset, default, or dynamic increment). Additionally or alternatively, the server and/or base station may determine that a hysteresis parameter defined for, at least, the first hybrid uplink channel should be decreased to a particular value or decreased by a particular value (e.g., by a preset, default, or dynamic increment), for example.

Continuing to block 306, computer-readable instructions are generated and executed that instruct and cause the base station(s) identified to adjust an inter-frequency threshold that corresponds to the first hybrid uplink channel. In various aspects, the method 300 includes determining, identifying, and/or defining one or more new or adjusted values for one or more inter-frequency thresholds, for one or more uplink channels, whether hybrid or non-hybrid. For example, a server and/or a base station can define a first new value for a first inter-frequency threshold that corresponds to the first hybrid uplink channel, and can define a second new value for a second inter-frequency threshold that correspond to a second non-hybrid uplink channel. In such an example, the computer-readable instructions that are generated and executed instruct and cause the base station(s) identified to adjust the first and second inter-frequency thresholds using the first and second new values. The computer-readable instructions can be communicated to the one or more base stations that are identified, or a subset thereof, in various aspects. The computer-readable instructions can be automatically generated, communicated (as further discussed), and executed without human interaction and without manual implementation.

The computer-readable instructions, when communicated to the base station and executed via one or more processors, instruct the base station to adjust the inter-frequency threshold for the first hybrid uplink channel by replacing an existing value for the inter-frequency threshold with a predetermined value or a dynamically determined value, in aspects. The computer-readable instructions, when executed via one or more processors, instruct the base station to adjust the inter-frequency threshold for the first hybrid uplink channel by increasing an existing value for the inter-frequency threshold using a predetermined increment or a dynamically determined increment, in some aspects. In an aspect the computer-readable instructions communicated to the base station cause the base station to generate an RRC reconfiguration message, which the base station communicates and pushes to one or more user devices in the correspond coverage area of the base station. The RRC configuration, for example, causes reconfiguration of how the one or more user devices operate in the terrestrial network, such that the one or more user devices implement and adhere to the new and/or adjusted inter-frequency threshold value(s) and/or hysteresis parameter for, at least, the first hybrid uplink channel. The new and/or adjusted inter-frequency threshold value(s) and/or hysteresis parameter are subsequently utilized, and this controls when and whether a particular user device is handed over or transitioned from one uplink channel to another, such as from the first hybrid uplink channel to the second non-hybrid uplink channel.

The computer-readable instructions may be communicated from the one or more base stations to all user devices that are associated with the one or more base stations identified, in some aspects. In other aspects, the computer-readable instructions may be communicated to a subset of user devices that are associated with the one or more base stations identified, such as, for example, a subset of user devices that are identifiable by the base station(s) as operating in a cell edge range based on signal quality measurements (e.g., RRSP, RSRQ) and/or geographic location information of the user devices relative to the nearest base station(s).

In various aspects of the method 300, it is determined whether to transfer a second user device from the first hybrid uplink channel to a second non-hybrid channel in the plurality of uplink channels based on one or more signal quality measurements of the user device(s) over the first hybrid uplink channel relative to the new or adjusted inter-frequency threshold defined for the first hybrid uplink channel, subsequent to the adjustment discussed above. The determination can be performed automatically by a server and/or base station, for example, without human interaction or manual intervention.

When an signal quality measurement of a user device over the first hybrid channel (being used terrestrially with the base station) is less than the new or adjusted inter-frequency threshold for the first hybrid uplink channel, computer-readable instructions are generated and executed that instruct and cause the base station to transition the user device from the first hybrid uplink channel to the second non-hybrid uplink channel at the same base station, or to transition the user device from the first hybrid uplink channel to a third non-hybrid uplink channel at a neighboring base station. When an signal quality measurement of the user device over the first hybrid channel (being used terrestrially with the base station) is greater than or equal to the inter-frequency threshold for the first hybrid uplink channel, no handover would occur (i.e., a determination is made that a handover should not be performed; that no handover is to be performed). Further adjustments to inter-frequency thresholds can be implemented by repeating the method 300 in response to subsequently received degradation indicators. A new or adjusted value for an inter-frequency threshold and/or hysteresis parameter may be used for a predetermined time period that may lapse, at which point a preset, default, or previously used value can be re-instituted for the inter-frequency threshold for the first hybrid uplink channel, in aspects.

Continuing to FIG. 4, it will be understood from this discussion that any and all aspects discussed with regard to method 300 can also apply to any and/or all of the aspects discussed with regard to method 400. At block 402, a degradation indicator for a first hybrid uplink channel between a first user device and an aerospace access point is received, wherein the degradation indicator including a unique identifier for the aerospace access point. At block 404, a base station is identified by querying a database using the unique identifier for the aerospace access point in the degradation indicator, wherein the base station being identified as having a coverage area that at least partially overlaps with a current coverage area of the aerospace access point, and wherein the base station utilizes the first hybrid uplink channel. At block 406, computer-readable instructions are generated and executed that instruct and cause the base station to adjust an inter-frequency threshold that corresponds to the first hybrid uplink channel.

At block 408, a plurality of radio frequency (RF) quality measurements (also referred to herein as "signal quality") are received by the base station from a second user device, subsequent to adjustment of the inter-frequency threshold, wherein each RF quality measurement in the plurality of RF quality measurements corresponds to a different uplink channel in the plurality of uplink channels of the base station. At block 410, it is determined by a server and/or base station, based on the plurality of RF quality measurements relative to the plurality of inter-frequency thresholds, whether to transfer the second user device from the first hybrid uplink channel to a second non-hybrid channel in the plurality of uplink channels. At block 412, additional computer-readable instructions are generated and executed that instruct and cause the base station to transfer the second user device from the first hybrid uplink channel to the second non-hybrid uplink channel. A new or adjusted value for an inter-frequency threshold and/or hysteresis parameter may be used for a predetermined time period that may lapse, at which point a preset, default, or previously used value can be re-instituted for the inter-frequency threshold for the first hybrid uplink channel, in aspects.

In further aspects of the methods 300 and 400, additional degradation indicator(s) for the first hybrid uplink channel between the user device and the aerospace access point is subsequently received, for example, after the computer-readable instructions have been communicated to the base station as previously described. As such, the first hybrid uplink channel can be periodically or continuously monitored such that any quantity of additional degradation indicators may be received to report on signal quality. Based on the additional degradation indicator(s), it can be determined that the first hybrid uplink channel does not meet the quality threshold and further actions adjust inter-frequency threshold(s) and/or hysteresis parameter(s) can be implemented using the methods 300 and 400, iteratively. Based on such determinations, additional computer-readable instructions are generated for instructing base station(s) to adjust inter-frequency thresholds and/or hysteresis parameters for one or more user device(s) for the first hybrid uplink channel. The additional computer-readable instructions are then communicated to the base stations, wherein the additional computer-readable instructions cause the base station(s) to adjust inter-frequency thresholds and/or hysteresis parameters for the first hybrid uplink channel.

Figure 5:
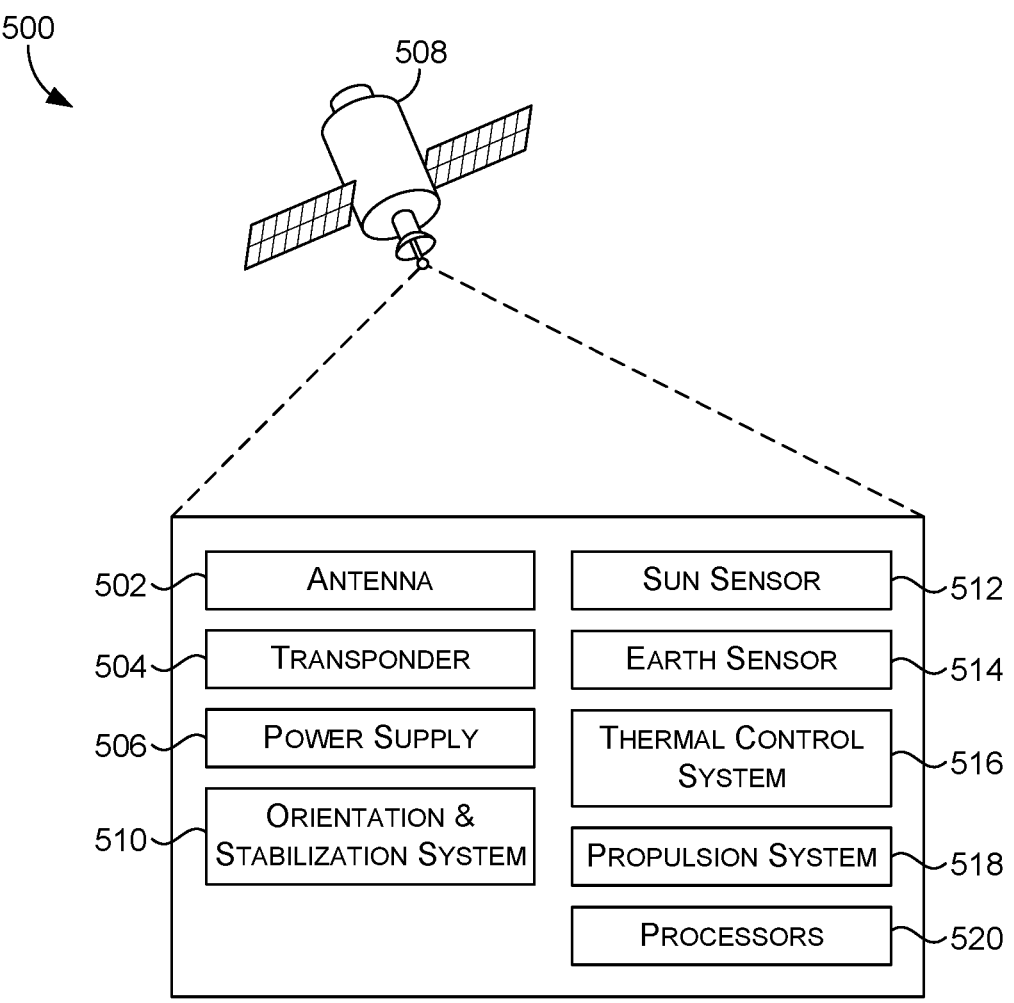
FIG. 5 illustrates an example aerospace access point suitable for use in implementations of the disclosure.

FIG. 5 provides a diagram of an example aerospace access point 500 and/or system for use in implementations of the present disclosure. The aerospace access point 500, such as a satellite, may include an antenna 502, a transponder 504, a power supply 506, and a housing 508, in aspects. The aerospace access point 500 can further include one or more of an orientation and stabilization system 510, a sun sensor 512, an Earth sensor 514, a thermal control system 516, a propulsion system 518, one or more processors 520, or any combination thereof.

The antenna 502, as previously described herein, may comprise one or more antennas. For example, the aerospace access point 500 can include a command antenna and a communication antenna. As such, the aerospace access point 500 can utilize a command antenna when communicating for telemetry and tracking, while using the communication antenna to receive uplink and/or downlink communications from terrestrial devices, such as a user device, satellite dish, and/or base station.

The transponder 504 comprises hardware that operates as a transmitter-receiver system for processing and modifying radio frequencies based on receiving signals and/or transmitting signals using one or more antennas. In various aspects, the aerospace access point 500 may include a plurality of transponders. Transponders can include subcomponents, for example, such as a duplexer, noise amplifiers (e.g., low noise amplifier), processors (e.g., carrier processors), power amplifiers, filters, frequency converters, oscillators, modulators, and/or any combination or quantity thereof.

The power supply 506 operates to provide power to the aerospace access point 500 and the aerospace access point components. The power supply 506 can include one or more components for capturing, storing, releasing, and/or controlling the flow of power to provide power for the operations of the aerospace access point components. Examples of a power supply include a battery or a solar panel or array.

The housing 508 is a physical structure that encloses or physically protects components of the aerospace access point 500. A solar array and/or antennas may be positioned outside or may be attached to a housing, whereas processors and thermal control systems may be housed within the housing 508.

The orientation and stabilization system 510 is configured to stabilize the aerospace access point 500, such as spin stabilization and/or three-axis (e.g., yaw axis, roll axis, and pitch axis) stabilization. The orientation and stabilization system 510 can include or utilize the sun sensor 512 and/or the Earth sensor 514 in various aspects. The orientation and stabilization system 510 can also communicate with and provide instructions to the propulsion system 518 in order to modify the positon and orientation of the aerospace access point 500, or specific components, such as a solar array or antenna(s). For example, the orientation and stabilization system 510 can, via sensors, detect spin or rotation and utilize the propulsion system 518 (e.g., thrusters) to modify or control the speed of rotation (e.g., the speed by which the aerospace access point 500 is spinning around its own central, vertical axis) in order to stabilize the aerospace access point 500. The orientation and stabilization system 510 can include one or more momentum wheels or reaction wheels, driven by motors, and which are mounted on three perpendicular axes (e.g., yaw axis, roll axis, and pitch axis).

The sun sensor 512 is a navigational sensor configured to detect the direction and position of the sun, and to determine the orientation of the aerospace access point with respect to the sun. The sun sensor 512 can further be configured to provide positional information and data that can be used to align a power supply system component, such as a solar array, to capture light. The Earth sensor 514 is a navigational sensor configured to detect the direction and position of the Earth (e.g., detection of light at or near the Earth's horizon when in orbit), and to determine orientation of the aerospace access point 500 with respect to the Earth. The Earth sensor 514 can provide positional information and data that can be used to determine orientation to the Earth's edge, for example, which may be used to determine roll angle and pitch.

The thermal control system 516 regulates and/or maintains optimized temperatures that ensure proper functioning of the aerospace access point 500 and the aerospace access point components. Examples of thermal control systems include thermoelectric coolers, heaters, fluid loop systems, and the like.

The propulsion system 518 operates to modify the position, orientation, pitch, and/or angle of the aerospace access point 500 and any components located on the exterior of the housing 508 of the aerospace access point 500, when the aerospace access point 500 is in orbit. The propulsion system 518 can be an "in-space" propulsion system that can rely on and utilize chemical propulsion, electric propulsion, and/or propellant-less propulsion. The propulsion system 518 can include, for example, thrusters, jets, solar sails, electrodynamic tethers, aerodynamic drag devices, monopropellant systems, bipropellant systems, hybrid propellants, cold/warm gas propellants, liquid propellants, solid propellants, electrothermal propulsion, electrospray propulsion, gridded ion propulsion, Hall-effect propulsion, pulsed plasma propulsion, vacuum arc propulsion, ambipolar propulsion, and any combination thereof. The propulsion system 518 may be controlled by processors and/or can work in tandem with or as a subsystem of the orientation and stabilization system 510, in various aspects.

The one or more processors of the aerospace access point 500 can be utilized by and can support any or all of the components and subsystems discussed above, and can perform any and all aspects described with regard to the methods 300 and 400 of FIGS. 3 and 4. As such, the one or more processors are specially configured to determine the uplink quality between a user device that communicates directly with the aerospace access point 500 using an uplink channel, when the aerospace access point 500 is in orbit. The processor(s) may further generate a degradation indicator that includes a unique identifier of the aerospace access point 500 and that indicates that the uplink quality of the uplink channel is below a threshold, in response to determining that the uplink quality is below the threshold. The aerospace access point 500 may communicate the degradation indicator to a terrestrial wireless network for receipt and processing by a terrestrial component.

Figure 6:
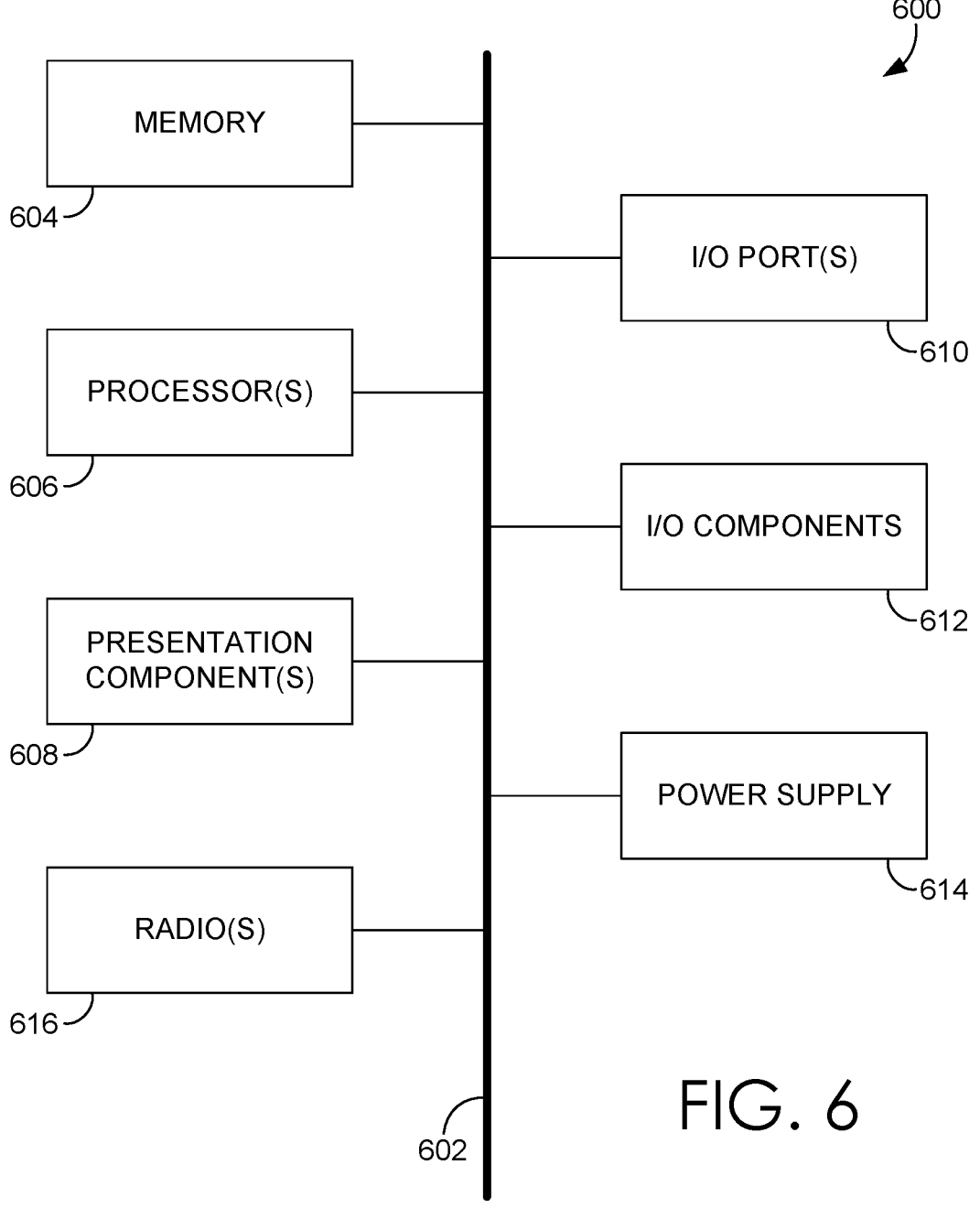
FIG. 6 illustrates an example computing device suitable for use in implementations of the disclosure.

Turning now to FIG. 6, a diagram is depicted of another example computing device suitable for use in implementations of the present disclosure. Computing device 600 is but one example of a suitable computing environment and is not intended to suggest any limitation as to the scope of use or functionality of the invention, and nor should computing device 600 be interpreted as having any dependency or requirement relating to any one or combination of components illustrated.

The implementations of the present disclosure may be described in the general context of computer code or machine-useable instructions, including computer-executable instructions such as program components being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 602 that directly or indirectly couples with the following devices: memory 604, one or more processors 606, one or more presentation components 608, input/output (I/O) ports 610, I/O components 612, and power supply 614. Bus 602 represents what may be one or more buses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 612. Also, processors, such as one or more processors 606, have memory. Distinction is not made between such categories as "workstation," "server," "laptop," "handheld device," etc., as all are contemplated within the scope of FIG. 8 and refer to "computer" or "computing device."

Computing device 600 typically includes a variety of computer-readable media. Computer-readable media can be any available media that can be accessed by computing device 400 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information, such as computer-readable instructions, data structures, program modules or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal (such as a carrier wave or other transport mechanism), and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer storage media in the form of volatile and/or non-volatile memory. Memory 604 may be removable, non-removable, or a combination thereof. Examples of memory include solid-state memory, hard drives, optical disc drives, etc. Computing device 600 includes one or more processors 606, which read data from various entities such as bus 602, memory 604, or I/O components 612. One or more presentation components 608 present data indications to a person or other device. Examples of one or more presentation components 608 include a display device, speaker, printing component, vibrating component, etc. I/O ports 610 allow computing device 600 to be logically coupled to other devices including I/O components 612, some of which may be built in computing device 600. Illustrative I/O components 612 include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, or other VoIP communications. As can be appreciated, in various aspects the radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some aspects.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:

receiving a degradation indicator for a first hybrid uplink channel between a first user device and an aerospace access point, the degradation indicator including a unique identifier for the aerospace access point;

identifying a base station by querying a database using the unique identifier for the aerospace access point in the degradation indicator, the base station being identified as having a coverage area that at least partially overlaps with a current coverage area of the aerospace access point, wherein the base station utilizes the first hybrid uplink channel; and generating and executing computer-readable instructions that instruct and cause the base station to adjust an inter-frequency threshold that corresponds to the first hybrid uplink channel.

2. The computerized method of claim 1, wherein the computer-readable instructions instruct the base station to adjust the inter-frequency threshold for the first hybrid uplink channel by replacing an existing value for the inter-frequency threshold with a predetermined value or a dynamically determined value.

3. The computerized method of claim 1, wherein the computer-readable instructions instruct the base station to adjust the inter-frequency threshold for the first hybrid uplink channel by increasing an existing value for the inter-frequency threshold using a predetermined increment or a dynamically determined increment.

4. The computerized method of claim 1 where the base station is further identified as concurrently utilizing the first hybrid uplink channel and utilizing a second non-hybrid uplink channel in a plurality of uplink channels.

5. The computerized method of claim 1 comprising determining to adjust the inter-frequency threshold by increasing a value that defines a hysteresis parameter.

6. The computerized method of claim 1 wherein the computer-readable instructions for the base station comprise an RRC reconfiguration.

7. The computerized method of claim 1, further comprising:

defining a first new value for a first inter-frequency threshold that corresponds to the first hybrid uplink channel; and defining a second new value for a second inter-frequency threshold that correspond to a second non-hybrid uplink channel, wherein the computer-readable instructions instruct and cause the base station to adjust the first and second inter-frequency thresholds using the first and second new values.

8. The computerized method of claim 1, wherein subsequent to executing the computer-readable instructions that cause the base station to adjust the inter-frequency threshold on the first hybrid uplink channel:

determining whether to transfer a second user device from the first hybrid uplink channel to a second non-hybrid uplink channel in a plurality of uplink channels based on a radio frequency (RF) quality measurement for the first hybrid uplink channel relative to the inter-frequency threshold for the first hybrid uplink channel subsequent to adjustment;

when an RF quality measurement for the first hybrid uplink channel is less than the inter-frequency threshold for the first hybrid uplink channel, generating and executing computer-readable instructions that instruct and cause the base station identified to further adjust at least the inter-frequency threshold that corresponds to the first hybrid uplink channel; and when an RF quality measurement for the first hybrid uplink channel is greater than or equal to the inter-frequency threshold for the first hybrid uplink channel, continuing use of the inter-frequency threshold as adjusted.

9. One or more non-transitory computer-readable media storing instructions that when executed via one or more processors perform a computerized method, the computerized method comprising:

receiving a degradation indicator for a first hybrid uplink channel between a first user device and an aerospace access point, the degradation indicator including a unique identifier for the aerospace access point;

identifying one or more base stations by querying a database using the unique identifier for the aerospace access point in the degradation indicator, the one or more base stations being identified as having one or more coverage areas that at least partially overlap with a current coverage area of the aerospace access point, wherein the one or more base stations utilize the first hybrid uplink channel; and generating and executing computer-readable instructions that instruct and cause at least one base station of the one or more base stations identified to adjust a plurality of inter-frequency thresholds that correspond to a plurality of uplink channels, the plurality of uplink channels including the first hybrid uplink channel.

10. The one or more non-transitory computer-readable media of claim 9, the computerized method further comprising, via the one or more processors, receiving a plurality of radio frequency (RF) quality measurements communicated from a second user device to the at least one base station, each RF quality measurement in the plurality of RF quality measurements corresponding to a different uplink channel in the plurality of uplink channels.

11. The one or more non-transitory computer-readable media of claim 10, the computerized method further comprising, via the one or more processors, determining, based on the plurality of RF quality measurements relative to the plurality of inter-frequency thresholds subsequent to adjustment, whether to transfer the second user device from the first hybrid uplink channel to a second non-hybrid uplink channel in the plurality of uplink channels.

12. The one or more non-transitory computer-readable media of claim 11, the computerized method further comprising, via the one or more processors, generating and executing additional computer-readable instructions that instruct and cause the at least one base station to transfer the second user device from the first hybrid uplink channel to the second non-hybrid uplink channel.

13. The one or more non-transitory computer-readable media of claim 10, wherein the computerized method further comprising: determining, based on the plurality of RF quality measurements relative to the plurality of inter-frequency thresholds subsequent to adjustment, whether to transfer the second user device from the first hybrid uplink channel to a second non-hybrid uplink channel in the plurality of uplink channels, wherein the determining comprises:

when at least one RF quality measurement exceeds at least one corresponding inter-frequency threshold, subsequent to adjustment, in the plurality of inter-frequency thresholds, determining to transfer the second user device from the first hybrid uplink channel to the second non-hybrid uplink channel in the plurality of uplink channels.

14. The one or more non-transitory computer-readable media of claim 9 further comprising, via the one or more processors, causing the plurality of inter-frequency thresholds to be communicated to a plurality of user devices connected to the at least one base station, the plurality of user devices including second user device.

15. The one or more non-transitory computer-readable media of claim 9, wherein a second user device is transferred to a second non-hybrid uplink channel at the at least one base station; or wherein the second user device is transferred to the second non-hybrid uplink channel at another base station neighboring the at least one base station.

16. The one or more non-transitory computer-readable media of claim 9 wherein each individual threshold in the plurality of inter-frequency thresholds corresponds to an individual corresponding uplink channel in the plurality of uplink channels, and wherein the media further comprises, via the one or more processors:

defining a first new value for a first inter-frequency threshold that corresponds to the first hybrid uplink channel;

defining a second new value for a second inter-frequency threshold that correspond to a second non-hybrid uplink channel; and wherein the computer-readable instructions instruct and cause the at least one base station to modify the first inter-frequency threshold to the first new value and to modify the second inter-frequency threshold to the second new value.

17. A system comprising:

a server having one or more processors, the server operating within a telecommunications network, the server communicatively coupled to a base station within the telecommunications network, wherein the one or more processors perform:

receiving a degradation indicator for a first hybrid uplink channel between a first user device and an aerospace access point, the degradation indicator including a unique identifier for the aerospace access point;

identifying the base station by querying a database using the unique identifier for the aerospace access point in the degradation indicator, the base station being identified as having a coverage area that at least partially overlaps with a current coverage area of the aerospace access point, wherein the base station utilizes the first hybrid uplink channel; and generating and executing computer-readable instructions that instruct and cause the base station to adjust an inter-frequency threshold that corresponds to the first hybrid uplink channel.

18. The system of claim 17 further comprising the base station, wherein the base station comprises a plurality of terrestrial access points providing service to a plurality of user devices.

19. The system of claim 17 further comprising a telecommunications core network component that acts as an interface between an aerospace network and the telecommunications network.

20. The system of claim 17 further comprising the telecommunications network that interfaces with an aerospace network having one or more devices configured to act as aerospace access points to one or more user devices.

* * * * *